March 3, 1964 H. D. DAIGH 3,123,060
CONTROL DEVICE FOR A CRANKCASE VENTILATING SYSTEM
Filed March 4, 1963 2 Sheets-Sheet 1

INVENTOR.
HAROLD D. DAIGH
BY Donald W Canady
ATTORNEY

United States Patent Office 3,123,060
Patented Mar. 3, 1964

3,123,060
CONTROL DEVICE FOR A CRANKCASE
VENTILATING SYSTEM
Harold D. Daigh, Rolling Hills Estates, Calif., assignor to Richfield Oil Corporation, Los Angeles, Calif., a corporation of Delaware
Filed Mar. 4, 1963, Ser. No. 262,528
6 Claims. (Cl. 123—119)

This invention relates to a crankcase ventilating system for an internal combustion engine and more particularly, relates to a system for recycling crankcase blowby into the induction system by providing an external conduit between the crankcase and the induction system with a blowby flow control device positioned in the conduit to regulate the recycle of blowby fumes into the induction system.

In my U.S. Patent No. 3,077,871 issued February 19, 1963 on a "Crankcase Ventilating System for Internal Combustion Engines," a valve device is disclosed for controlling the flow of crankcase blowby into the induction system of an internal combustion engine, which valve opens in response to crankcase pressure buildup and closes in response to intake manifold vacuum, thus closing the blowby conduit leading from the crankcase to the intake manifold when intake manifold vacuum is high to prevent drawing excessive oil, combustion products, dirt, and water from the crankcase into the induction system, but opening at higher throttle settings when blowby volumes are at a maximum. This system is intended to pass maximum blowby at wide-open throttle and relies primarily upon the crankcase pressure buildup to open the valve device.

It is considered desirable from the air pollution control standpoint to prevent the accumulation of pressure buildup in the crankcase by putting a slight vacuum on the crankcase through a blowby recycle conduit or providing for ready dissipation of the crankcase blowby fumes. At wide-open throttle the blowby is at a maximum value and although the intake manifold vacuum which tends to close the valve is normally at a low value at wide-open throttle, the valve is still not opened sufficiently by the excess of blowby to allow the blowby fumes to pass into the induction system without a pressure buildup in the crankcase. In order to prevent crankcase pressure buildup, it is desirable to provide means external to the valve for assisting in the opening of the valve sufficiently to pass maximum blowby fumes through the valve to thereby prevent blowby pressure buildup in the crankcase.

It is, therefore, an object of my present invention to provide a means for preventing blowby pressure buildup in the crankcase of an internal combustion engine.

It is also an object of the present invention to provide a means for maintaining a slight vacuum on the crankcase of an internal combustion engine utilizing in a conduit between the crankcase and the induction manifold a blowby recycle valve which is normally closed by intake manifold vacuum and opened by crankcase blowby.

It is also an object of my present invention to provide a means for opening independent of the crankcase blowby a valve positioned in a conduit between the crankcase and the induction manifold.

It is also an object of the present invention to provide a vacuum externally on a flexible blowby ventilator valve positioned in a conduit between the crankcase and the induction manifold which is normally closed by intake manifold vacuum and opened by crankcase pressure buildup to thereby facilitate opening of the valve independent of crankcase blowby.

It is a further object of my present invention to provide a vacuum-tight receptacle for a valve device positioned in a conduit between the crankcase and the induction manifold to assist in opening the valve.

Other objects and a more complete understanding of my present invention may be had by reference to the following specification and the appended claims when taken in conjunction with the drawings, wherein:

Figure 1:
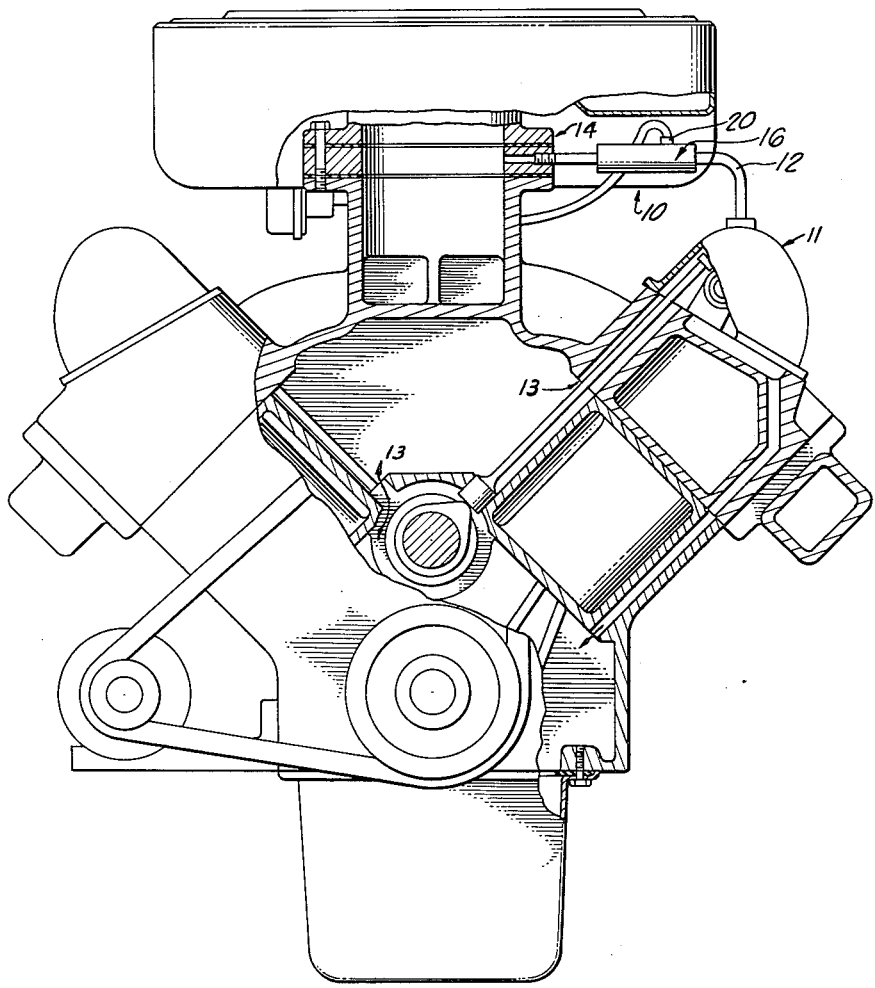
FIG. 1 shows, partially in cross section, an internal combustion engine utilizing my present invention.
Figure 2:
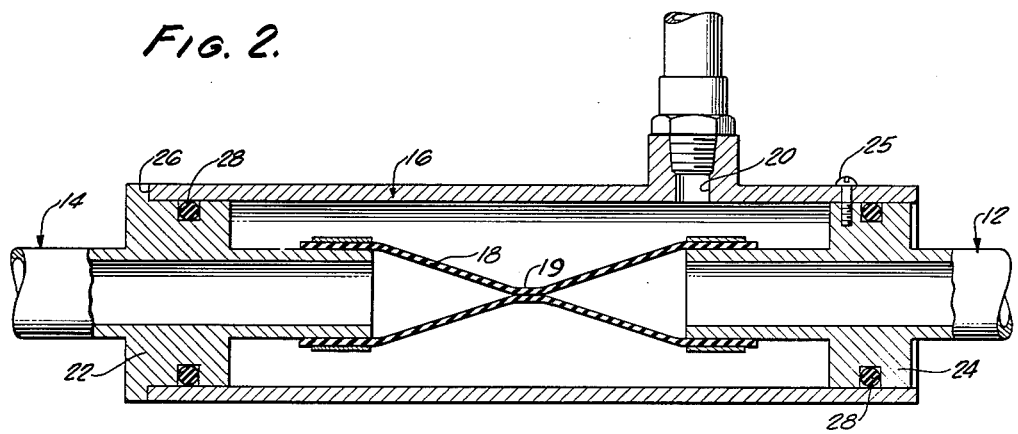
FIG. 2 shows an enlarged view of the valve and vacuum chamber of my present invention taken on line 2—2 of FIG. 1.

Referring generally to the drawings, FIG. 1 shows a blowby recycle device 10 positioned on an internal combustion engine in the conduit 12 between the engine and the intake manifold system 14 and consists of a flexible tubular valve 18 (FIG. 2) housed in a vacuum-tight chamber 16 having an outlet 20 whereby a vacuum may be pulled from any convenient engine source to thereby assist the tubular valve 18 in opening wider at a lower crankcase pressure under conditions where only a slight intake manifold vacuum exists.

Referring now more specifically to the apparatus shown in FIG. 1, a chamber 16 for tubular valve member 18 of the type shown in Patent No. 3,077,871 is mounted in the conduit 12 around two valve fittings 22 and 24. The conduit may be mounted on the engine at any point subject to crankcase pressure as, for example, the rocker arm cover 11, as shown in FIG. 1. Arrow 13 indicates the passage of crankcase blowby fumes. The valve assembly, including the chamber, may be supported by the rigid conduit member 12 to which the fittings 22 and 24 are attached. The fitting 22 has a shouldered portion 26 to prevent axial movement relative to the chamber 16 and the chamber 16 is removably affixed to the fitting 24, as with set screw 25, so that the chamber 16 may be removed from the valve by releasing chamber 16 from the fitting 24 and sliding the chamber off of the shouldered fitting 22. The chamber 16 may be of any rigid material and is provided with an outlet 20. The chamber is made vacuum tight by providing seals 28 which are positioned between the fittings 22 and 24 and the vacuum-tight chamber 16.

It is considered desirable, as previously stated, to maintain at least a slight vacuum on the crankcase to prevent the escape of blowby fluids into the atmosphere; hence, the blowby pressure in the crankcase should be less than one atmosphere. It is, therefore, desirable to provide a readily openable passageway between the intake manifold and the crank case. The apparatus of my Patent No. 3,077,871 may be adapted to accomplish this purpose by providing the vacuum-tight chamber 16 around the flexible tubular valve 18 and imposing a vacuum within the chamber, which vacuum assists in the opening of the preformed closed or partially closed section 19 of the tubular valve 18 and to aid opening of the valve 18 when even slight crankcase pressure exists.

It is desirable to impose a slight vacuum on the chamber 16 of between one atmosphere and about five inches of mercury vacuum. Such vacuum imposed externally on the valve 18 will assist in opening valve 18 when the intake manifold vacuum which tends to close the valve 18 is relatively low, that is, not more than about one to two inches of mercury. Normally, at wide open throttle where the blowby is greatest, the intake manifold vacuum is minimal and the crankcase pressure will open the valve to pass blowby fluids through the valve. The present device, however, by imposing a vacuum on the exterior portion of the valve, tends to increase the opening to thereby pass more blowby through the valve into the intake manifold and insure the prevention of crankcase pressure buildup.

Figure 3:
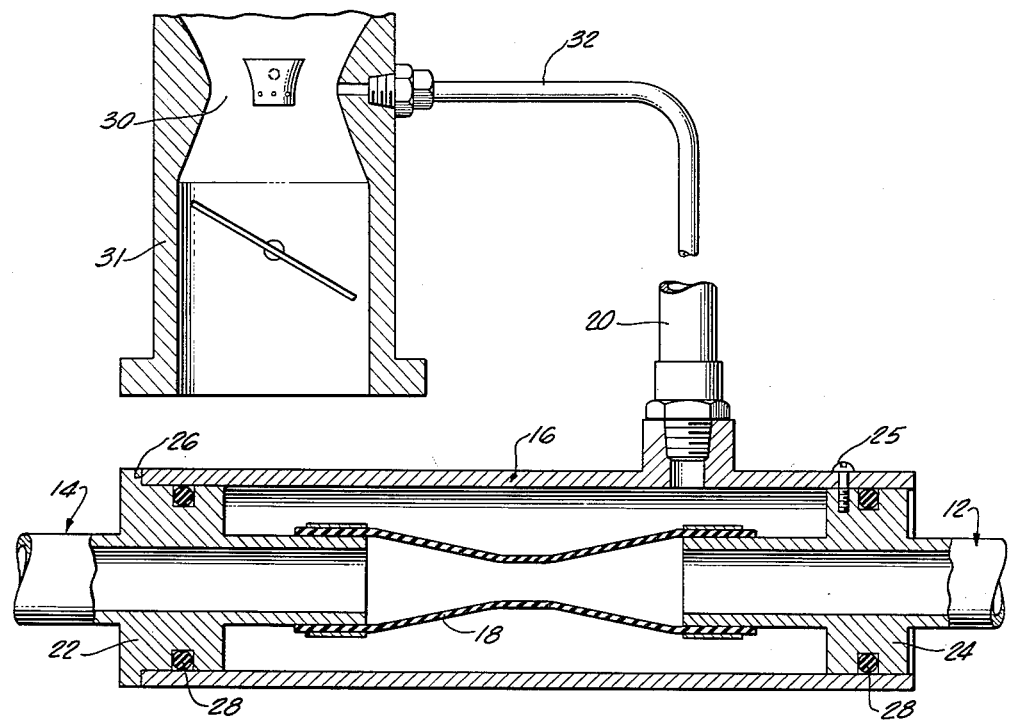
FIG. 3 shows a preferred embodiment of my present invention wherein the vacuum-tight chamber surrounding the valve is subject to the vacuum of the carburetor venturi.

The maximum blowby fumes exist at relatively low r.p.m.'s and high throttle power settings. At high throttle settings the vacuum of the venturi throat 30 of the carburetor, as shown in FIG. 3, is at a maximum value and thus, since this venturi vacuum is high when the blowby emissions in the crankcase are high, the venturi vacuum is a convenient vacuum source for the vacuum-tight chamber 16 to provide maximum opening of valve 18 and, hence, dissipation of peak blowby. FIG. 3 shows the vacuum chamber 16 connected to the venturi throat 30 of the carburetor 31 with hose 32, to thereby impose a partial vacuum on the exterior of tubular valve 18. It is also within the purview of the present invention to connect the vacuum-tight chamber 16 with vacuum sources such as the carburetor air cleaner, the exhaust system, etc. to assist in the opening of the tube valve 18.

Although I have described my present invention with a certain degree of particularity, it is to be understood that the scope of my invention is not to be limited by the details set forth, but should be afforded the full breadth of the appended claims.

I claim:

1. In a crankcase ventilating system for an internal combustion engine having an opening in the engine above the oil level through which blowby fumes can escape the engine and conduit means providing fluid communication between said opening and the induction system of said engine, said opening being subject to the crankcase pressure, and wherein a valve means is positioned in said conduit means, said valve means being normally closed in response to manifold vacuum and adapted to open in response to pressure buildup in said crankcase to pass blowby fluids through said conduit means into said induction system, the improvement comprising:
a chamber adapted to receive said valve means, and
means for maintaining a vacuum within said chamber to assist in opening said valve means.

2. In a crank case ventilating system for an internal combustion engine having an opening in the engine above the oil level through which blowby fumes can escape the engine and conduit means providing fluid communication between said opening and the induction system of said engine, said opening being subject to the crankcase pressure, and wherein a valve means is positioned in said conduit means, said valve means being normally closed in response to manifold vacuum and adapted to open in response to pressure buildup in said crankcase to pass blowby fluids through said conduit means into said induction system, the improvement comprising:
a chamber adapted to receive said valve means, and
means for maintaining a vacuum within said chamber to assist in opening said valve means when the pressure exerted by the blowby in said crankcase exceeds one atmosphere.

3. In a crankcase ventilating system for an internal combustion engine having an opening in the engine above the oil level through which blowby fumes can escape the engine and conduit means providing fluid communication between said opening and the induction system of said engine, said opening being subject to the crankcase pressure, and wherein a valve means is positioned in said conduit means, said valve means being normally closed in response to manifold vacuum and adapted to open in response to pressure buildup in said crankcase to pass blowby fluids through said conduit means into said induction system, the improvement comprising:
a chamber adapted to receive said valve means, and
means for maintaining a vacuum within said chamber to assist in opening said valve means at high throttle settings.

4. In a crankcase ventilating system for an internal combustion engine having an opening in the engine above the oil level through which blowby fumes can escape the engine and conduit means providing fluid communication between said opening and the induction system of said engine, said opening being subject to the crankcase pressure, and wherein a valve means is positioned in said conduit means, said valve means being normally closed in response to manifold vacuum and adapted to open in response to pressure buildup in said crankcase to pass blowby fluids through said conduit means into said induction system, the improvement comprising:
a vacuum-tight chamber adapted to operatively house said valve means, and
means for maintaining a slight vacuum in said chamber to thereby facilitate opening of said valve means at relatively low intake manifold vacuum to pass blowby fluids from said crankcase into said intake manifold through said valve means.

5. In a crankcase ventilating system for an internal combustion engine having an opening in the engine above the oil level through which blowby fumes can escape the engine and conduit means providing fluid communication between said opening and the induction system of said engine, said opening being subject to the crankcase pressure, and wherein a valve means is positioned in said conduit means, said valve means being normally closed in response to manifold vacuum and adapted to open in response to pressure buildup in said crankcase to pass blowby fluids through said conduit means into said induction system, and wherein said engine is provided with a carburetor capable of developing a vacuum in the venturi throat thereof, the improvement comprising:
a vacuum-tight chamber adapted to operatively house said valve means, and
means for imposing the carburetor venturi vacuum on said chamber to thereby facilitate opening of said valve at relatively low manifold vacuum to pass crankcase blowby fluids into said intake manifold.

6. A crankcase ventilating system for internal combustion engines, comprising in combination:
an opening in the crankcase above the oil level through which blowby fluids can escape the crankcase,
an opening in the induction system,
conduit means connecting said crankcase opening with said induction system opening,
valve means positioned within said conduit means, said valve means being normally held closed by intake manifold vacuum and adapted to open in response to crankcase pressure buildup in said crankcase to pass said fluids through said conduit means through said induction system, a vacuum-tight chamber adapted to house said valve means, and
means for maintaining a slight vacuum in said chamber to thereby assist in the opening of said valve means at relatively low manifold vacuum to recycle crankcase blowby into said induction manifold.

References Cited in the file of this patent

UNITED STATES PATENTS 2,587,188 McFadden _____ Feb. 26, 1952
2,735,642 Norman _____ Feb. 21, 1956